United States Patent
Cole et al.

(10) Patent No.: US 8,451,320 B1
(45) Date of Patent: May 28, 2013

(54) METHODS AND APPARATUS FOR STEREOSCOPIC VIDEO COMPRESSION, ENCODING, TRANSMISSION, DECODING AND/OR DECOMPRESSION

(75) Inventors: David Michael Cole, Pembroke Pines, FL (US); Alan McKay Moss, Signal Mountain, TN (US); David Roller, Jr., Atlanta, GA (US)

(73) Assignee: Next3D, Inc., Atlanta, GA (US)

( * ) Notice: Subject to any disclaimer, the term of this patent is extended or adjusted under 35 U.S.C. 154(b) by 478 days.

(21) Appl. No.: 12/693,421

(22) Filed: Jan. 25, 2010

Related U.S. Application Data

(60) Provisional application No. 61/146,668, filed on Jan. 23, 2009, provisional application No. 61/161,397, filed on Mar. 18, 2009.

(51) Int. Cl.
*H04N 13/00* (2006.01)
*H04N 15/00* (2006.01)

(52) U.S. Cl.
USPC .......................................................... 348/43

(58) Field of Classification Search
USPC ................ 375/240.01–240.26; 348/42–43, 348/51–52

IPC ............................................. H04N 13/00,15/00
See application file for complete search history.

(56) References Cited

U.S. PATENT DOCUMENTS

| | | | |
|---|---|---|---|
| 2009/0015662 A1* | 1/2009 | Kim et al. | 348/43 |
| 2009/0220213 A1* | 9/2009 | Ogawa et al. | 386/95 |
| 2010/0103249 A1* | 4/2010 | Lipton et al. | 348/51 |

\* cited by examiner

*Primary Examiner* — Tung Vo
(74) *Attorney, Agent, or Firm* — Straub & Pokotylo; Michael P. Straub; Stephen T. Straub

(57) ABSTRACT

Methods and apparatus for performing stereoscopic image encoding and decoding are described. Left and right eye images are generated. Image difference information is generated, e.g., a set of pixel values resulting from XORing the pixel values of the left and right eye images. One of the left and right eye images is compressed along with the difference map. The compressed image and compressed difference map is stored and/or transmitted. Stereoscopic images are generated by decompressing and using the received compressed image and compressed difference information. Prior to generation of the difference map the left and right eye images may be subject to a transposition operation to minimize the differences between the images and thus the size of the difference map. When transposition is applied, transposition information is stored and communicated in addition to the compressed image data so that the transposition can be reversed during the stereoscopic image generation process.

22 Claims, 12 Drawing Sheets

METHODS AND APPARATUS FOR STEREOSCOPIC VIDEO COMPRESSION, ENCODING, TRANSMISSION, DECODING AND/OR DECOMPRESSION

RELATED APPLICATIONS

The present application claims the benefit of U.S. Provisional Patent Application Ser. No. 61/146,668 filed Jan. 23, 2009 and U.S. Provisional Patent Application Ser. No. 61/161,397 filed Mar. 18, 2009, each of which is hereby expressly incorporated by reference.

FIELD

The present invention is related to the field of stereoscopic imagery and, more particularly, the field of digital stereoscopic video acquisition, distribution and/or playback.

BACKGROUND OF THE INVENTION

Conventional stereoscopic video usually requires twice the storage capacity, transmission bandwidth and playback bandwidth of 2-dimensional video. This is due to the use of separate image streams for each of the left and right eyes with the two image streams often being coded independently from one another. The burden of the second video data stream can overwhelm existing modalities for content distribution such as, e.g., DVD disc, internet transmission, cable broadcast. Additionally, the burden of the second video data stream can exceed the data transfer capabilities of local storage media and the rendering capabilities of consumer digital video playback hardware. Finally, certain parameters of stereoscopic video, namely the convergence, require manipulation to adjust to screen size and viewer sensitivity for comfortable viewing. Conventional stereoscopic video has no provision for such adjustment.

In view of the above, it should be appreciated that there is a need for improved methods of stereoscopic video compression, encoding, transmission, decoding and decompression and/or manipulating stereoscopic video for presentation to take into consideration such factors as screen size and/or viewer preferences.

BRIEF SUMMARY OF THE INVENTION

Various embodiments of the present invention are directed to methods and apparatus for improved compression and encoding of digital stereoscopic video such that it can be generated, stored, transmitted and/or played back efficiently.

Methods and apparatus for performing stereoscopic image encoding and decoding are described. Left and right eye images are generated. Image difference information is generated, e.g., a set of pixel values resulting from XORing the pixel values of the left and right eye images. One of the left and right eye images is compressed along with the difference map. The compressed image and compressed difference map is stored and/or transmitted. Stereoscopic images are generated by decompressing and using the received compressed image and compressed difference information. Prior to generation of the difference map the left and right eye images may be subject to a transposition operation to minimize the differences between the images and thus the size of the difference map. When transposition is applied, transposition information is stored and communicated in addition to the compressed image data so that the transposition can be reversed during the stereoscopic image generation process.

In contrast to some approaches to stereoscopic video where convergence is difficult to change after image encoding, the method of the present invention is well suited for applications where a user, e.g., end viewer, may provide convergence information to be used in generating the final image to be displayed. In some embodiments, a graphical processing unit generates a single image from a left eye image and right eye image pair generated from data compressed in accordance with the present invention. The graphical processing unit can, and in some embodiments does, use convergence information provided by an end user in generating the single image. Thus, different viewers operating at different locations and having different viewing conditions can, and in some embodiments do, use different convergence settings to provide a better image result than might be achieved as compared to an embodiment where all users have to use a fixed predetermined convergence setting.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

FIGS. 1-4 show various steps associated with capturing, encoding, storing and communicating images for use in stereoscopic presentation.

Figure 1:
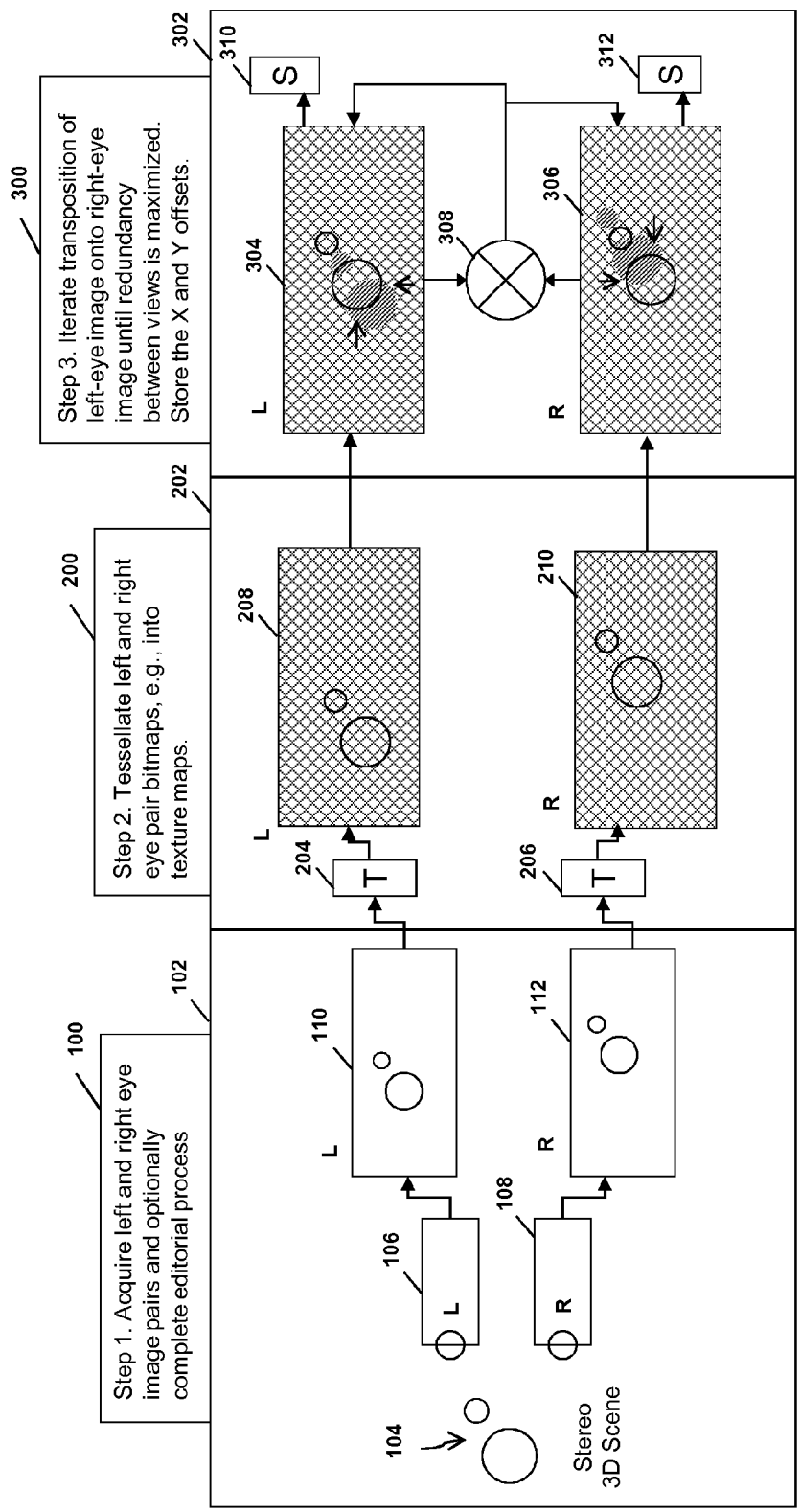
FIGS. 1-11 illustrate various processing steps which may, and sometimes are, performed in accordance with various exemplary embodiments of the present invention along with related modules and/or data.

In step 1 100, shown in FIG. 1, stereo video image acquisition and optionally editing is performed. A stereo 3D scene 104 is captured by separate left and right cameras 106, 108 which produce left and right images 110, 112 in the form of sets of pixel values as shown in bold 102.

In step 2 200 tessellation, e.g., tiling, is performed in steps 202, 206 on the left and right eye images to produce tessellated left and right eye images, e.g., textured maps. In one embodiment the tessellation operation includes decimation of the bitmapped stereoscopic video frame (left and right eye images 110, 112 which form an image eye pair) into texture maps as shown in block 202.

In step 3, which is optional, transposition of the tessellated left eye and right eye images 304, 308, e.g., in the horizontal and vertical planes is performed. The transposition is determined, e.g., through an interactive process, such that an XOR 308 (e.g., a logical XORing) of the left and right eye images results in the highest amount of redundant tiles between the pairs. The transposition offsets determined in step 300 are stored in steps 310, 312, e.g., in frame-referenced metadata for later retrieval and/or for transmission. In some embodiments the offsets represent shifts which are be applied to the left and right images in equal and opposite amounts.

Figure 2:
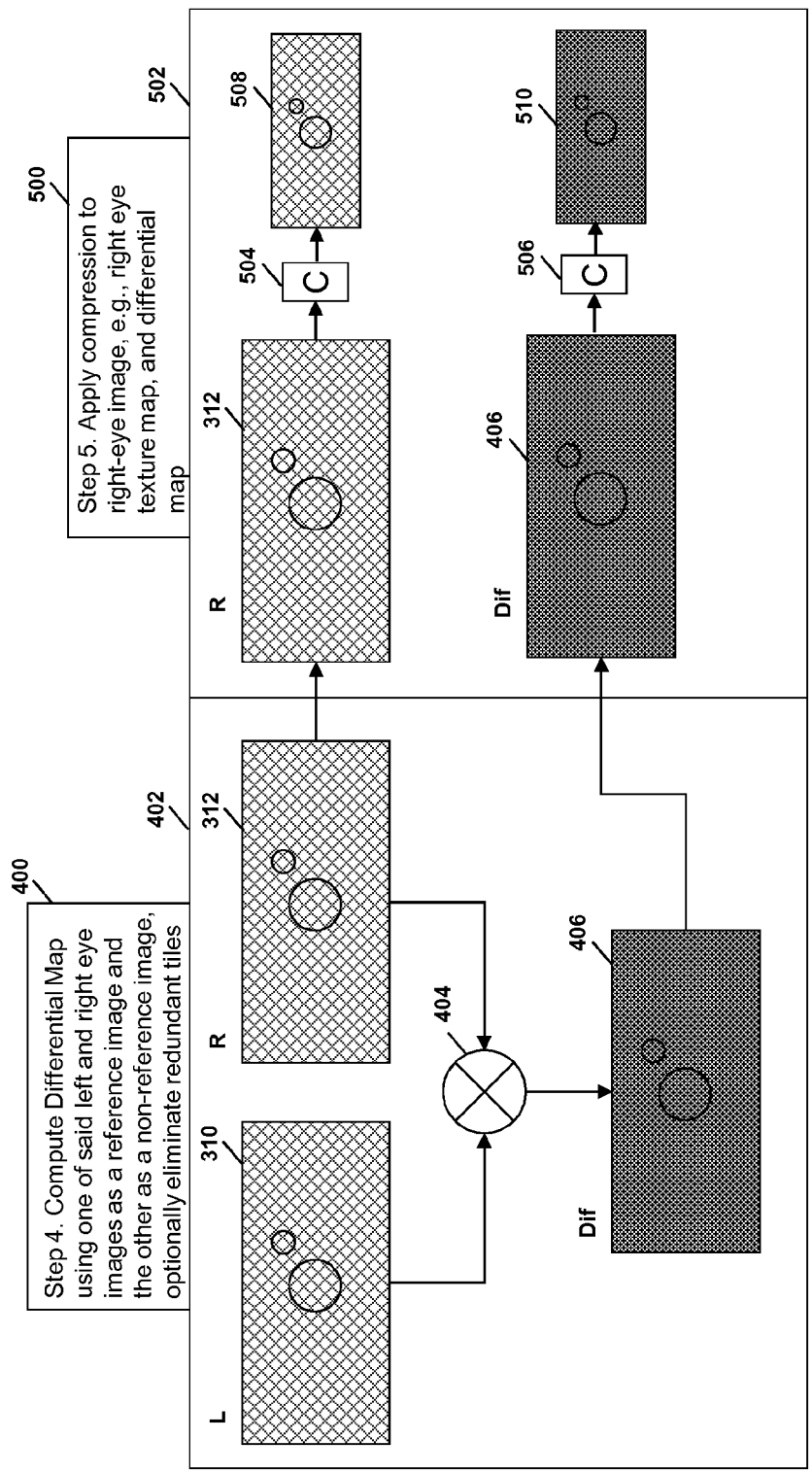

In step 4 400, shown in FIG. 2, the comparison, e.g., XOR 404, of the left and right eye image pairs 310, 312, resulting from at least one but normally both of the images in an image pair having been transposed in step 300, are processed to produce a differential map 406 as shown in block 402.

In step 5 500 one of the left and right eye images used as a reference frame is subjected to compression along with the differential map 406 generated in step 400. In the exemplary embodiment the right eye image is used as the reference frame with the transposed left eye image being used as the frame which is not stored or transmitted. The right eye image is compressed in step 504 to produce compressed image data 508. One of a plurality of standard image compression methods may be used on image 312, e.g., JPEG compression, MPEG compression, or wavelet compression. The difference map 406, e.g., a bit map of pixel values representing the difference between the transposed left eye image and right eye image is, in step 506 compressed as part of step 502 to produce compressed differential map 510. The same compression used on the right eye image may be used on the differential map 406. In some embodiments tiles which are completely redundant are eliminated from the differential map 406 prior to compression or are included in the differential map as 0 values. As should be appreciated long runs of 0 pixel values may be compressed efficiently in step 506.

Figure 3:
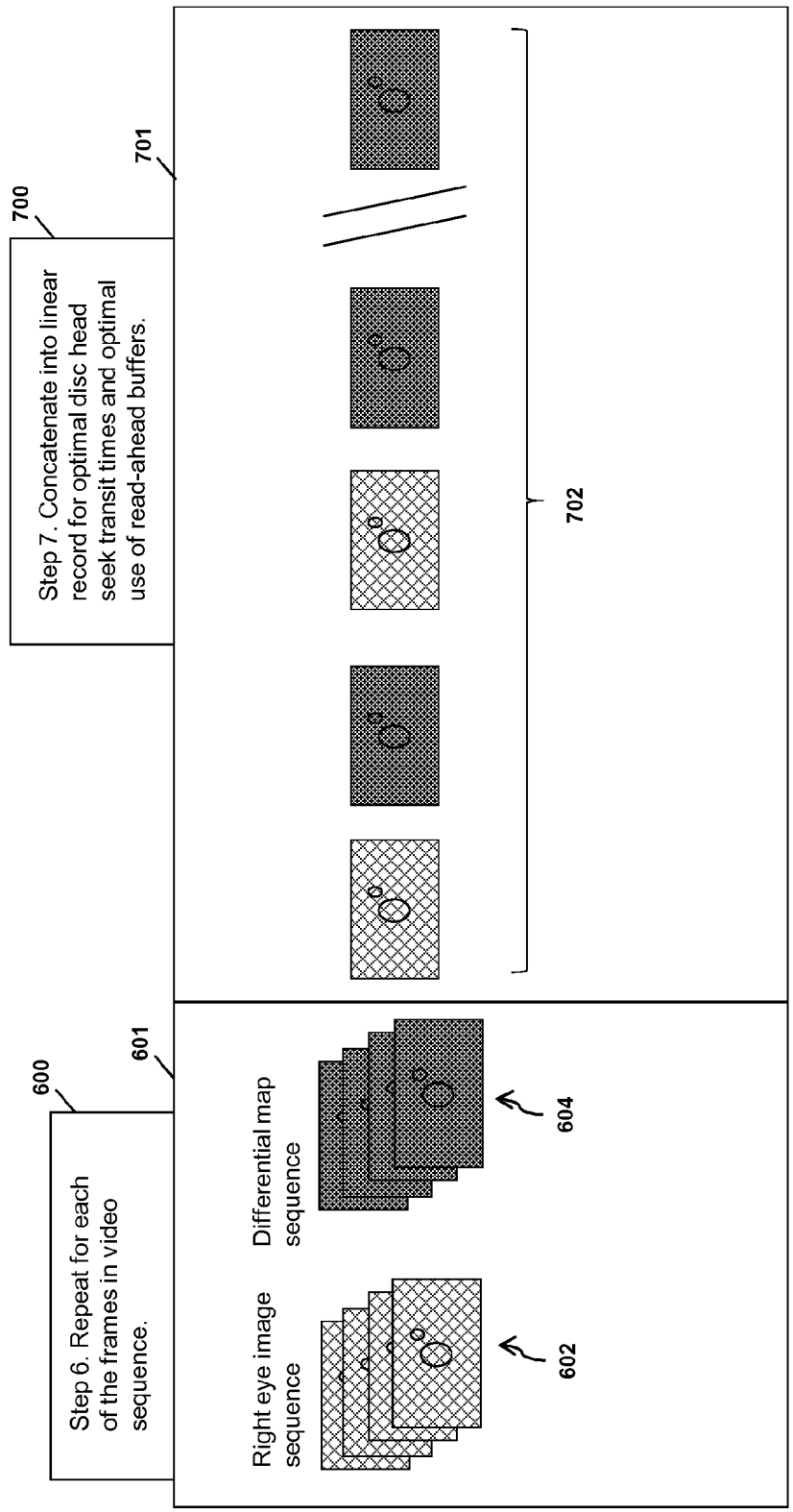

In step 600, shown in FIG. 3, the tessellation, optional transposition, differential map generation and compression operations are repeated for each image eye pair in a sequence of images representing a 3-D image sequence. The processing in step 600, shown in block 601, results in a right eye image sequence and a differential map sequence. As should be appreciated there is a one to one relationship between a compressed reference image, e.g., compressed right eye image in the sequence 602 and corresponding compressed differential map in the sequence 604.

In step 7 700, shown in FIG. 3, the compressed images and differential maps generated in step 600 are concatenated into a linear sequence 702 as shown in block 701 to create a liner record which can reduce disc head seek transit times and/or improve performance in the case where read-ahead buffers are used to access the data in the sequence 702.

It should be appreciated that step 6 600 and 7 700 depict the aggregation of frames in a video sequence being processed and the sequential concatenation of the frames into a linear data record for optimal disc head seek transit times and optimal use of read-ahead buffers during playback. The transposition offset information generated in step 300 may be, and in some embodiments is, included with the compressed image frame and corresponding differential map.

Figure 4:
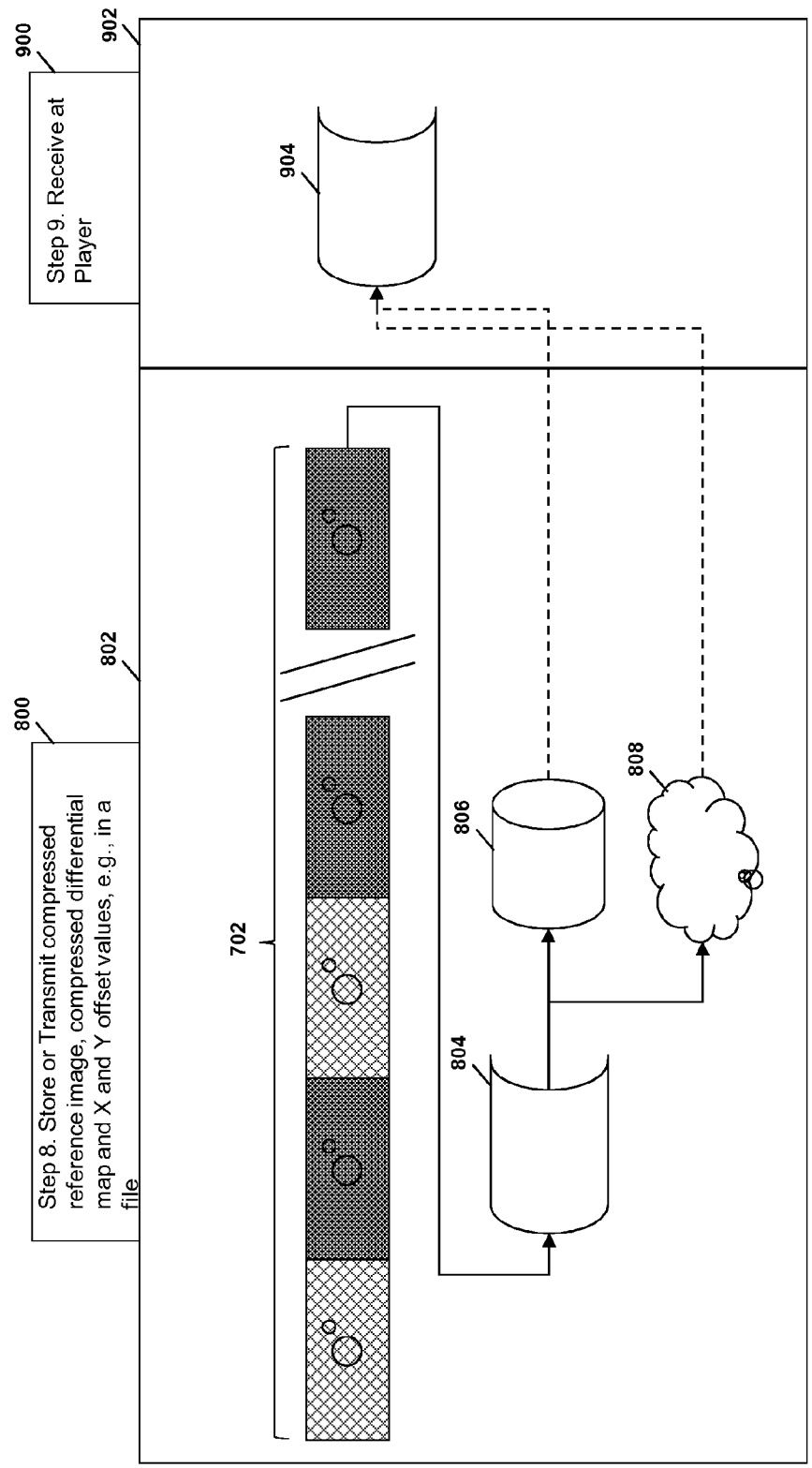

Step 8 800, shown in FIG. 4, illustrates the storage and/or transmission of the processed stereoscopic video. As shown in block 802, the image sequence 702, including transposition information, maybe put in a file 804 and stored in a storage device 806 or transmitted through a communications network 808 for reception by a receiver, e.g., playback device 904.

Step 9 900 depicts the reception or retrieval from storage 806 of the stereoscopic video 702 at the player's location, e.g., a set top box, television or other playback/image processing device such as a personal computer.

Figure 5:
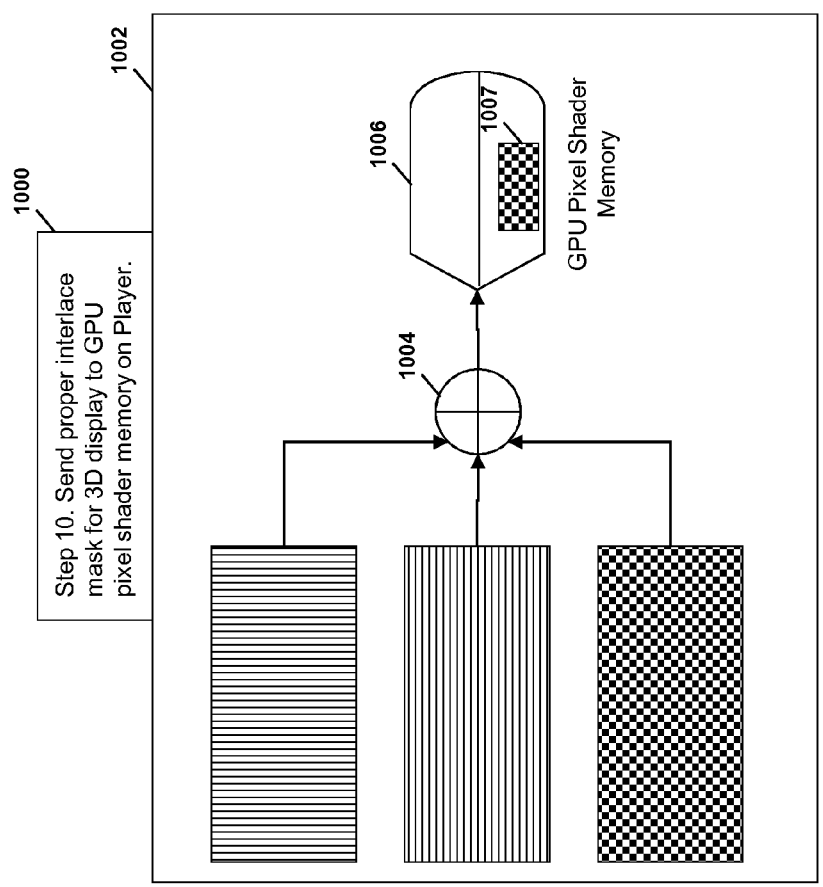

Step 10 1000 shown in FIG. 5 depicts, in block 1002 the preparation of the player hardware included in the receiver device by transferring a mask which corresponds to the stereo interlacing requirement of the display into a pixel shader memory 1007 of a graphics processing unit 1006 on the player. The inputs on the left represent the left eye image, right eye image and the background image which element 1004 represents a combining module for combining these elements.

Figure 6:
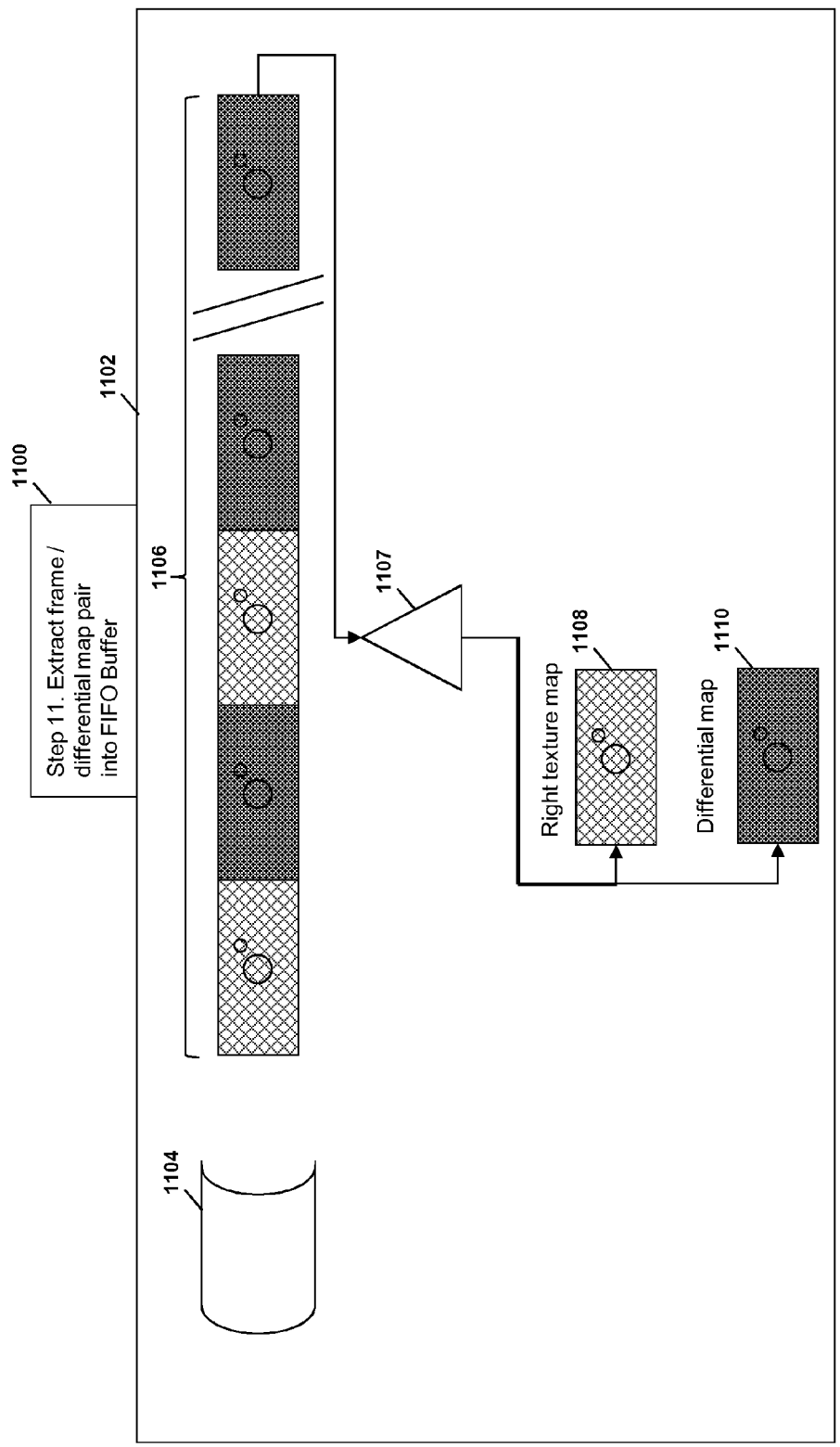
Figure 7:
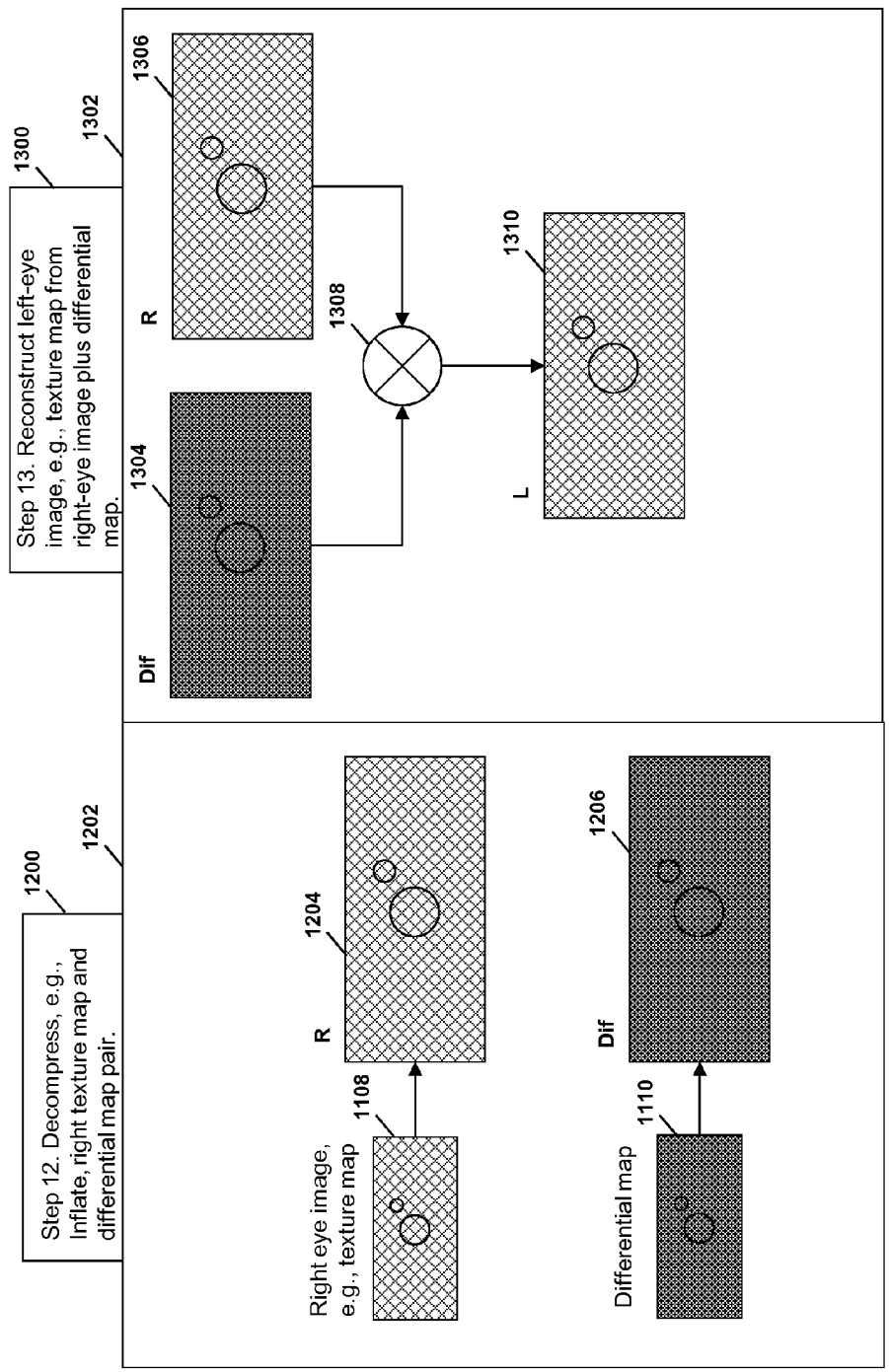

Step 11 1100 shown in FIG. 6 depicts, in block 1102, the extraction of the frames from storage 1104 into a FIFO buffer 1107.

Step 12 1200 depicts the decompression of the frames. As shown in block 1202 a decompressed right eye image 1204 is generated by performing decompression, e.g., image decoding, on the compressed right eye image 1108. In addition, the compressed differential map 1110 is subjected to decompression in to produce decompressed or inflated difference map 1206. The decompression operation is the inverse of the compression operation performed to generate the compressed image 1108 and compressed differential map 1110. MPEG, JPEG or wavelet transform decompression methods may be used depending on the original compression method. In some embodiments the same decompression method is used for the compressed right eye image, e.g., reference image and differential map allowing a single decompression module to perform both operations.

In step 13 1300 reconstruction of the left-eye image 1310 from the addition of the difference map to the reference image, e.g., right-eye image 1306, occurs thereby reversing the XORing used to create the difference map from the left and right eye images. The left eye image may have been subjected to transposition prior to the generation of the difference map. In cases where the optional transposition step was performed a reverse transposition step is implemented.

Figure 8:
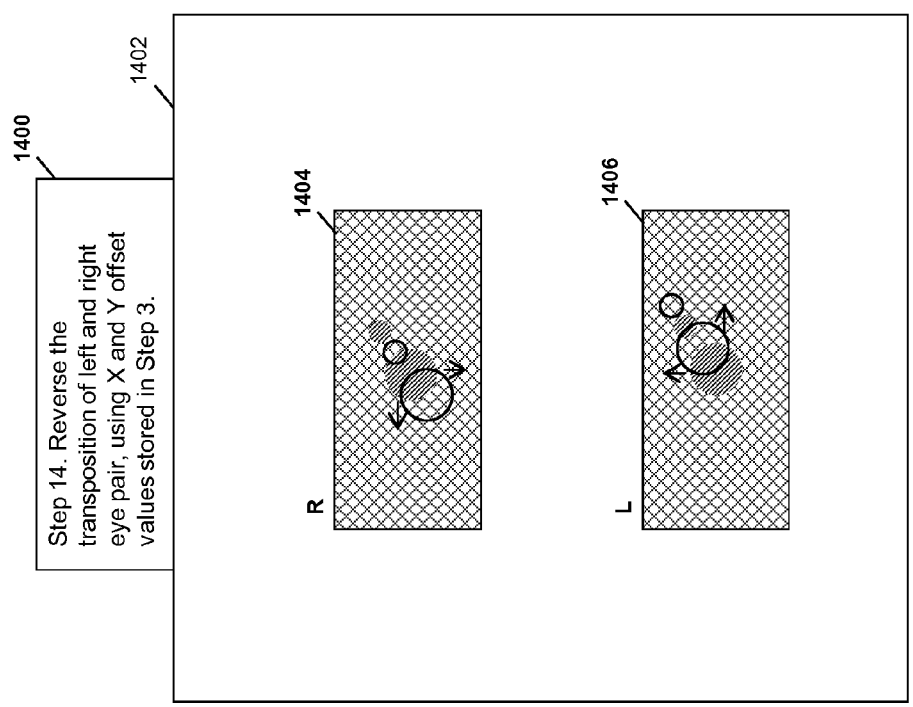

Step 14 1400 shown in FIG. 8 depicts the reverse transposition of the left and right eye views, e.g., where transposition is applied to both the left and right images prior to generation of the difference map as shown in block 1402. The X and Y shifts (vertical and horizontal image shifts) to be applied inversely the to the left and right images 1404, 1406 are obtained from the shift metadata included with the received compressed right eye image and differential map, e.g, frame-referenced metadata, to restore convergence to pre-encoding values.

Figure 9:
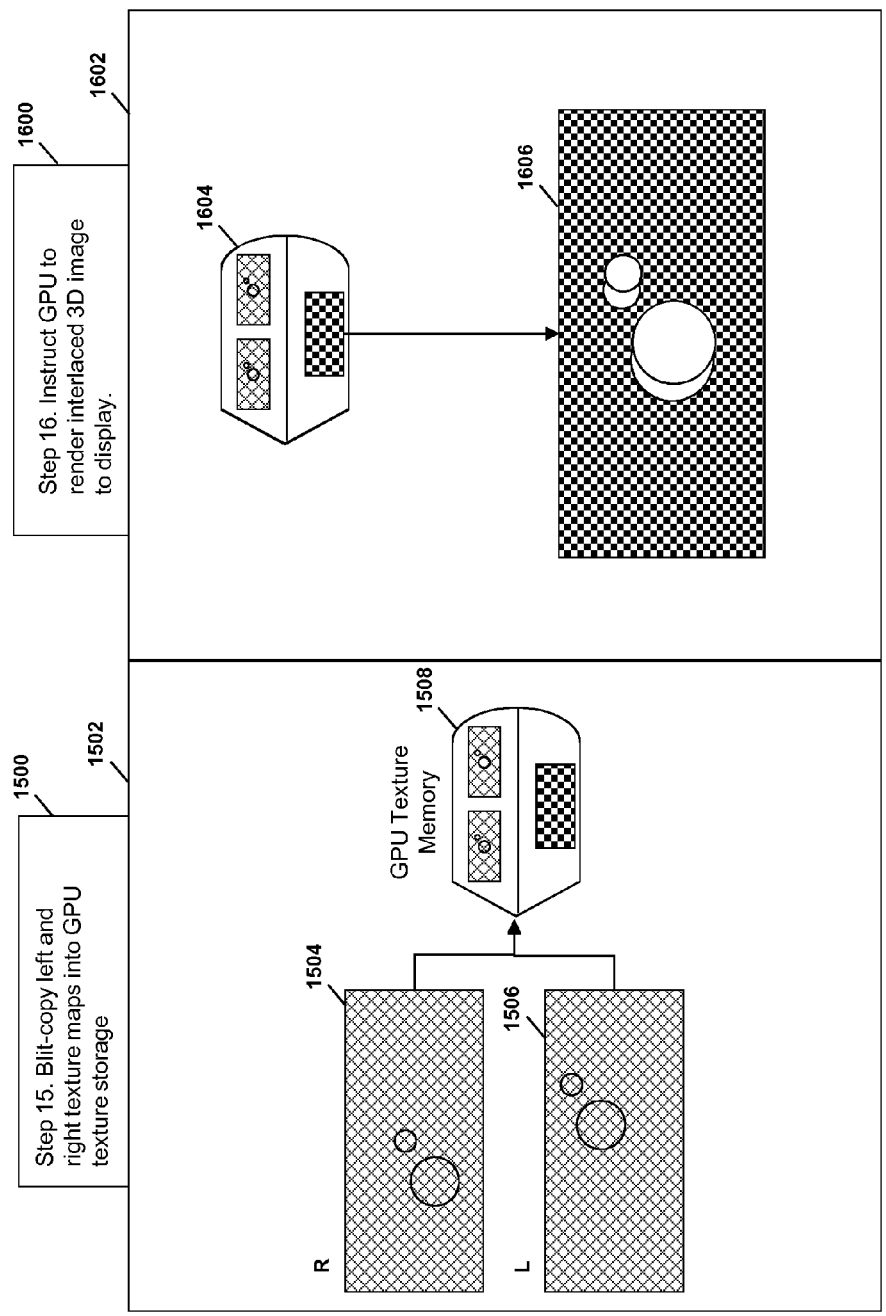

Step 15, shown in FIG. 9, depicts the blit-copying, e.g., loading, of left and right eye views 1504, 1506 resulting from the processing of step 1400 into texture memory of the graphics processing unit on the player device.

Figure 10:
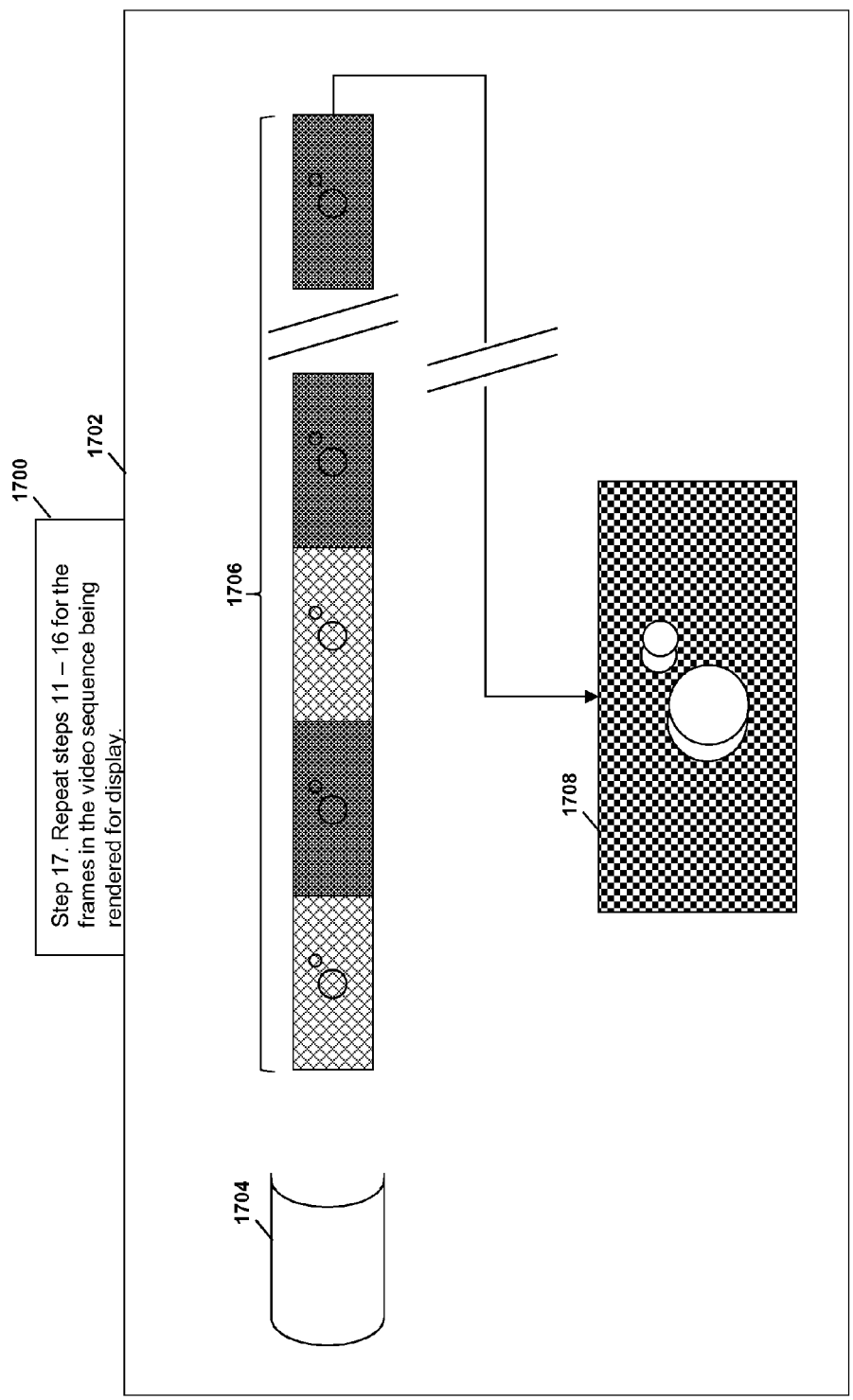

Step 16 1600, also shown in FIG. 9, depicts in block 1602 the execution of a single instruction 1604 to the player graphic processing unit to interlace the left-eye view with the right-eye view and render the resultant image 1606 to the display;

Step 17 1700, shown in FIG. 10, depicts the iteration of steps 11-16 to the frames in the stereoscopic video sequence being rendered for display on the display device 1708 which is shown with a rendered image from the sequence.

Figure 11:
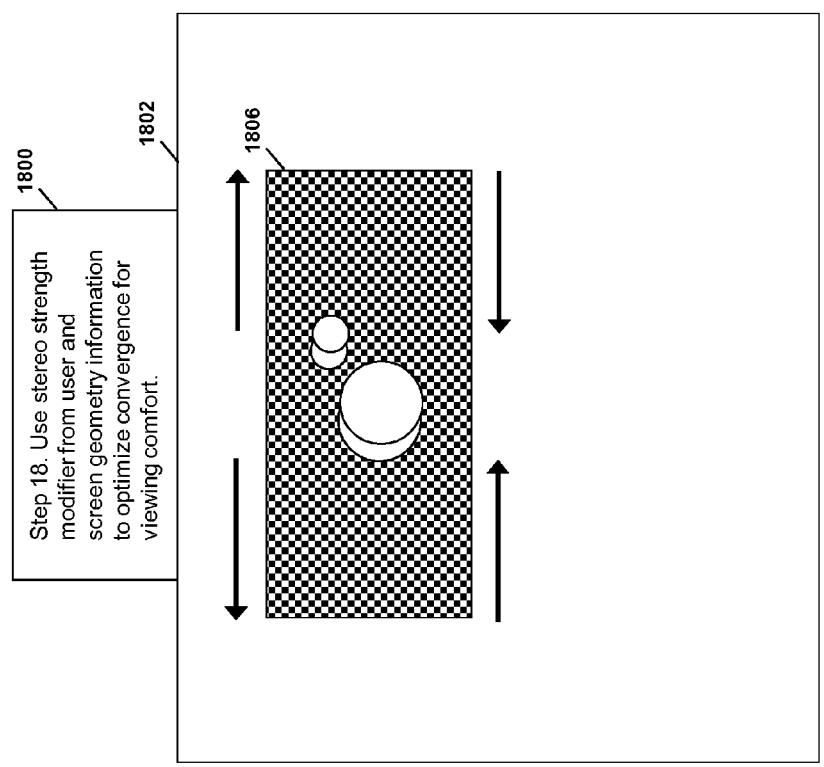

Step 18 1800, shown in FIG. 11, depicts in block 1802 automatic convergence adjustment of the stereoscopic image 1806, based on known screen geometry and user-fine-tuning of convergence, e.g., in response to user input, for maximum viewing comfort.

Some advantages of the present invention which should be appreciated include, without limitation, that stereoscopic video can be distributed to customers using less storage and transmission bandwidth than conventional stereoscopic video and, furthermore, that the player's graphic processing unit can be applied to reduce the hardware burden of rendering stereoscopic video to the display.

In some embodiments, the present invention can be implemented, e.g., as a set of software that encodes and compresses stereoscopic video on the acquisition and product end and then decodes and decompresses video at the player end prior to display on a display device.

Figure 12:
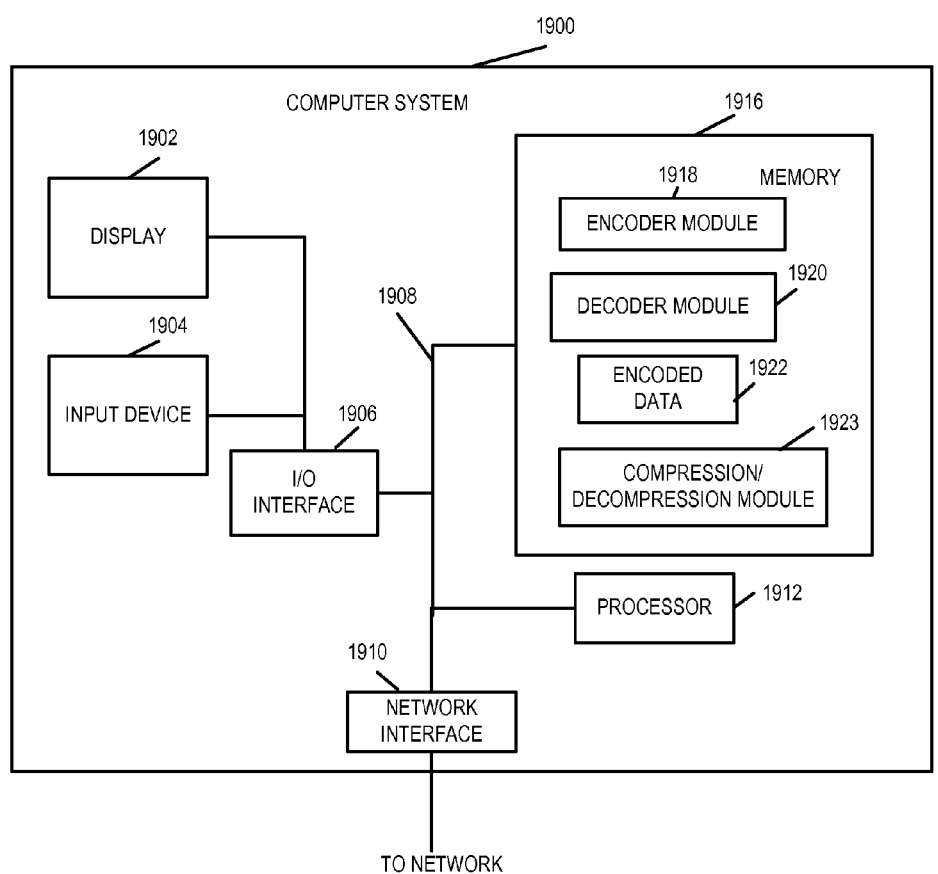
FIG. 12 illustrates a computer system which may be used to perform video compression, encoding, storage, transmission, decoding, decompression and/or other operations in accordance with the invention.

FIG. 12 illustrates a computer system 1900 for processing data, e.g., video data, implemented in accordance with one embodiment of the present invention. The computer system 1900 includes a display device 1902, input device 1904, memory 1916, processor 1912, I/O interface 1906, and network interface 1910. The display device 1902 may be used, e.g., to display images resulting from processing implemented in accordance with the present invention. Input device 1904 may be, e.g. a keyboard or other user input device. The display and input device are coupled to a bus 1908 by I/O interface 1906. The bus 1908 is also coupled to the memory 1916, processor 1912 and network interface 1910. The network interface 1910 couples the internal components of the system 1900 to an external network, e.g., the Internet, thereby allowing the system 1900 to receive and send data over a network. The processor 1912 controls operation of the computer system 1900 under direction of software modules and/or routines stored in the memory 1916. Memory 1916 includes an encoder module 1918, a decoder module 1920, encoded data 1922, and a compression/decompression module 1923. The memory includes a software routine, e.g., machine executable instructions, for implementing one or more of the above-described processing methods of the present invention. When executed by processor 1912, the encoder module 1918 controls the processor 1912 to encode at least some of the data in accordance with a method of the present invention. The processor 1912 executes the compression/decompression module 1923 to perform compression and decompression operations on at least some image data in accordance with the methods of the present invention. The resulting encoded data may and sometimes is, stored in memory 1916 for future use and/or communicated to another device. The encoded image data may be retrieved from storage, decoded and displayed or printed. Alternatively the encoded data may be transmitted to another device in encoded form for decoding and display.

The techniques of various embodiments may be implemented using software, hardware and/or a combination of software and hardware. Various embodiments are directed to apparatus, e.g., a video data processing system. Various embodiments are also directed to methods, e.g., a method of processing video data. Various embodiments are also directed to machine, e.g., computer, readable medium, e.g., ROM, RAM, CDs, hard discs, etc., which include machine readable instructions for controlling a machine to implement one or more steps of a method.

In one embodiment a apparatus for implementing the method includes a module for performing each recited step. In one embodiment the modules are software modules which are stored in memory and which, when executed by a processor, control the system including the processor to perform the step(s) of the method. In other embodiments, the modules are implemented in hardware. In one such embodiment an encoder circuit with hardware modules for performing the steps of the encoding, storage and transmission steps is provided. In one particular decoder embodiment a decoder circuit with hardware modules for performing the steps of the decompressing (e.g., decoding), reconstructing image(s) and performing reverse transposition is provided. In software based embodiments, a general purpose processor, computer or graphical processing unit may be controlled by software modules that include instructions which case processor, computer or graphical processing unit to implement the steps of the method(s) recited in the pending claims.

Various features of the present invention are implemented using modules. Such modules may, and in some embodiments are, implemented as software modules. In other embodiments the modules are implemented in hardware. In still other embodiments the modules are implemented using a combination of software and hardware. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the various embodiments described above will be apparent to those skilled in the art in view of the above description. Such variations are to be considered within the scope.

What is claimed is:

1. A method of encoding images, comprising:
    tessellating a left eye image and a right eye image, said left eye image and right eye image corresponding to a left and right eye image pair;
    performing transposition operations on said tessellated left and right eye images using transposition offsets which maximize redundancy between transposed tessellated left and right eye images generated by said transposition operations;
    generating, from the transposed tessellated left and right eye images, a differential map, said differential map providing information indicating the difference between a reference one of the transposed tessellated left and right eye images and a non-reference one of the transposed tessellated left and right eye images;
    performing a first compression operation on the reference one of the tessellated left and right eye images to generate a compressed reference image;
    performing a second compression operation on the differential map to generate a compressed differential map; and
    performing at least one of: i) storing the compressed reference image and compressed differential map and ii) transmitting the compressed reference image and compressed differential map.

2. The method of claim 1, further comprising:
    iteratively transposing said tessellated left and right images to determine transpositions which maximize redundancy between the resulting transposed tessellated left and right eye images.

3. The method of claim 2,
    wherein said tessellated left eye image and tessellated right eye image are bitmap images including a plurality of tiles;
    wherein maximum redundancy between the resulting transposed tessellated left and right eye images is determined based on the number of redundant tiles between said transposed tessellated left and right eye images; and wherein said differential map is a bit map including non-zero values for tiles of the transposed tessellated left and right eye images which do not match.

4. The method of claim 3, wherein each of said non-zero values is a difference between a bitmap value in the reference image and a bitmap value in the non-reference image.

5. The method of claim 3, further comprising:
performing said tessellating, transposing, generating, first compression operation and second compression operation for each of a plurality of left and right eye image pairs in a sequence of left and right eye image pairs to thereby generate a sequence of compressed reference images and corresponding compressed differential maps.

6. The method of claim 3, wherein performing a first compression operation and performing a second compression operation each include performing compression in accordance with a compression standard, the same compression standard being used to compress the reference image and the corresponding differential map.

7. The method of claim 6, wherein said compression standard is one of: i) a JPEG compression standard, ii) an MPEG compression standard and iii) a wavelet based compression standard.

8. The method of claim 1, further comprising:
prior to generating, from the transposed tessellated left and right eye images, a differential map:
storing information indicating an X offset and Y offset used to transpose one of the left eye image and right eye image to maximize the redundancy between the transposed tessellated left and right eye images prior to generating said differential map.

9. The method of claim 8, wherein the non-reference one of the transposed tessellated left eye image and right eye image is transposed using said indicated X and Y offsets prior to determination of said differential map.

10. The method of claim 8, wherein performing at least one of: i) storing the compressed reference image and compressed differential map and ii) transmitting the compressed reference image and compressed differential map includes storing the compressed reference image and compressed differential map in a file along with said X offset and said Y offset.

11. A method of processing compressed image data, the method comprising:
decompressing a compressed reference image to generate a first previously transposed one of a left eye image and a right eye image;
performing a first transposition on said first previously transposed one of said left eye image and said right eye image to shift said first previously transposed one of said left eye image and said right eye image by an amount indicated by transposition information included in a file with said compressed reference image to generate a first processed image;
decompressing a compressed differential map to generate a decompressed differential map; and
generating a second previously transposed one of the left eye image and right eye image from said first previously transposed one of said left eye image and said right eye image and said decompressed differential map; and
performing a second transposition on said generated second previously transposed one of said left eye image and said right eye image to shift said second previously transposed one of said left eye image and right eye image by an amount indicated by said transposition information to generate a second processed image.

12. The method of claim 11, wherein performing a first transposition includes performing an image shift in a direction which is opposite the direction of an image shift performed by said second transposition.

13. The method of claim 12, wherein each of said first and second transposition reverses a transposition performed during encoding prior to generation of said differential map.

14. The method of claim 11, further comprising:
retrieving said compressed image and said compressed differential map from a file.

15. The method of claim 14, wherein said file includes transposition information in the form of an X offset and a Y offset to be applied to at least one of said left and right eye images.

16. The method of claim 15, wherein decompressing a compressed reference image includes performing one of: i) a JPEG decompression operation, ii) an MPEG decompression operation and iii) a wavelet based decompression operation.

17. The method of claim 16, wherein decompressing a compressed differential map includes using the same decompression method used to decompress said compressed reference image to decompress said compressed differential map.

18. The method of claim 11 further comprising:
repeating, for each of a plurality of left and right image eye pairs for which image data is included in a file being processed, said steps of:
decompressing a compressed reference image to generate a first previously transposed one of a left eye image and a right eye image;
performing a first transposition on said first previously transposed one of said left eye image and said right eye image to shift said first previously transposed one of said left eye image and said right eye image by an amount indicated by transposition information included in a file with said compressed reference image to generate a first processed image;
decompressing a compressed differential map to generate a decompressed differential map;
generating a second previously transposed one of the left eye image and right eye image from said generated first previously transposed one of said left eye image and said right eye image and said decompressed differential map; and
performing a second transposition on said generated second previously transposed one of said left eye image and said right eye image to shift said second previously transposed one of said left eye image and right eye image by an amount indicated by said transposition information to generate a second processed image.

19. The method of claim 11, further comprising:
outputting said first processed image and said second processed image to a graphical processing unit;
operating the graphical processing unit to generate a single image from said first processed image and said second processed image, said graphical processing unit generating said single image as a function of convergence information provided by a user to whom the generated single image is to be displayed; and
displaying the generated single image on a display device.

20. A system for performing image compression, the system comprising:
a tessellating module for tessellating a left eye image and a right eye image, said left eye image and right eye image corresponding to a left and right eye image pair;
a processor configured to perform transposition operations on said tessellated left and right eye images using transposition offsets which maximize redundancy between transposed tessellated left and right eye images generated by said transposition operations;

a differential map generation module for generating, from the transposed tessellated left and right eye images, a differential map, said differential map providing information indicating the difference between a reference one of the transposed tessellated left and right eye images and a non-reference one of the transposed tessellated left and right eye images;

a compression module for performing a first compression operation on the reference one of the transposed tessellated left and right eye images to generate a compressed reference image, and for performing a second compression operation on the differential map to generate a compressed differential map; and a storage device for storing the compressed reference image.

21. A system for processing compressed image data, comprising:

a storage device for storing a compressed reference image with a corresponding differential map;

a decompression module for decompressing said compressed reference image to generate a first previously transposed one of a left eye image and a right eye image and decompressing a compressed differential map to generate a decompressed differential map;

a reconstruction module for generating a second previously transposed one of the left eye image and right eye image from said generated first previously transposed one of said left eye image and said right eye image and said decompressed differential map; and a processor configured to perform: i) a first transposition on said first previously transposed one of said left eye image and said right eye image to shift said first previously transposed one of said left eye image and said right eye image by an amount indicated by image transposition information included in a file with said compressed reference image to generate a first output eye image, and ii) a second transposition on said generated second previously transposed one of said left eye image and said right eye image to shift said second previously transposed one of said left eye image and right eye image by an amount indicated by said transposition information.

22. The system of claim 21, wherein said image transposition information is stored in said storage device; and wherein said each of said first transposition and said second transposition performed by said processor reverses a transposition performed during encoding prior to generation of said differential map.

* * * * *